Feb. 9, 1937.  E. A. CHENAULT  2,069,873
PROCESS FOR THE PRESERVATION OF ORGANIC MATERIAL
Original Filed Sept. 27, 1929
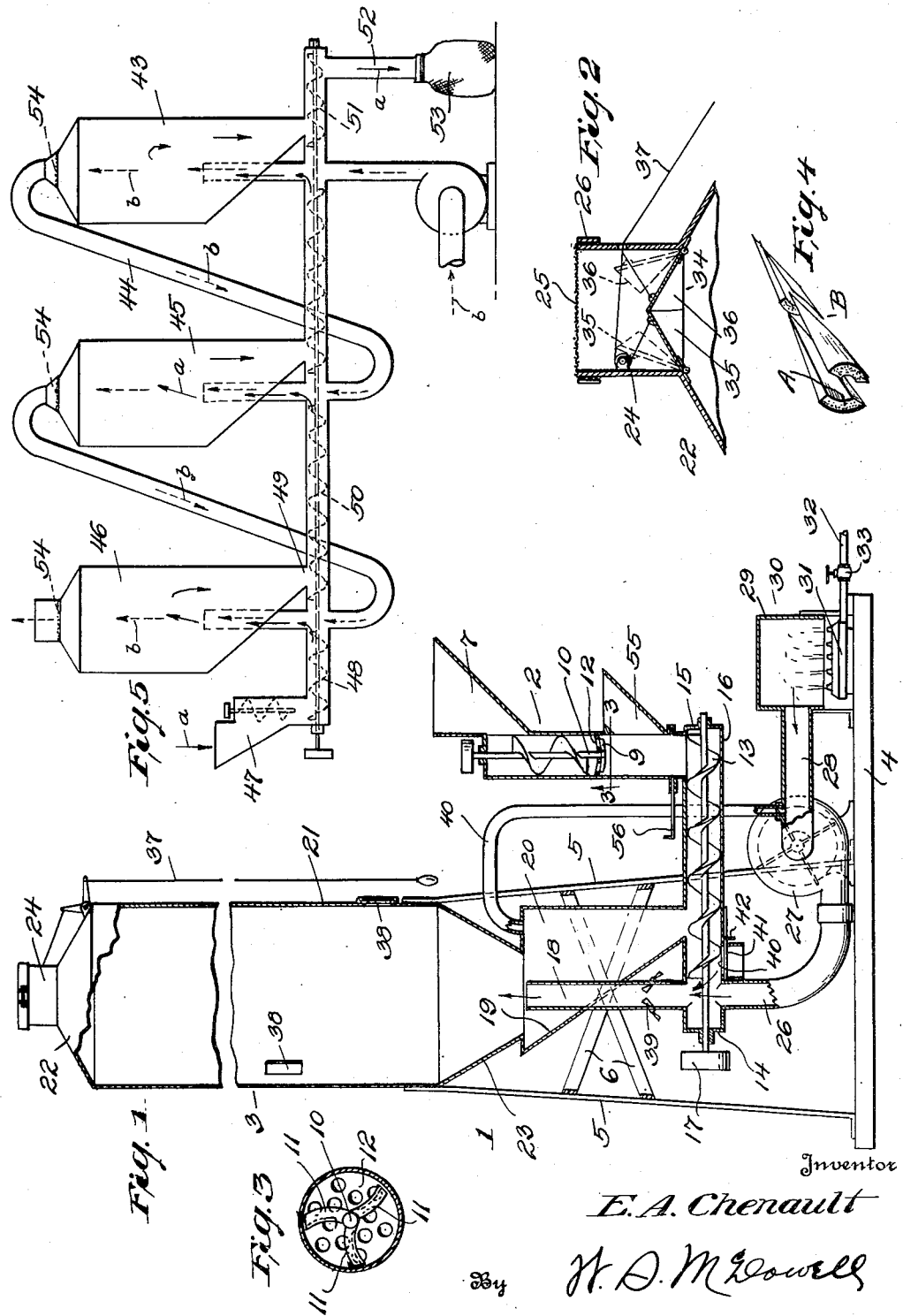
Inventor
E. A. Chenault
By H. D. McDowell
Attorney Patented Feb. 9, 1937

2,069,873

UNITED STATES PATENT OFFICE 2,069,873

PROCESS FOR THE PRESERVATION OF ORGANIC MATERIAL

Earl A. Chenault, Columbus, Ohio

Application September 27, 1929, Serial No. 395,644
Renewed March 23, 1936

13 Claims. (Cl. 99—8)

This invention relates to an improved process and apparatus for treating organic materials, and has for its particular object the treatment of organic materials such as hay, timothy, clover or other plant life of similar nature in order to preserve the natural color and food properties thereof so that such materials may be stored for future use as feed for livestock.

This process also has reference to an improved method of treating green, freshly mown forage or hay forming plants, preparatory to their being desiccated or cured.

The object of so processing such plants is to accelerate reduction of their moisture content by evaporation; to make possible advantageous drying or curing of such plants when cut at any stage of growth; to make possible and to facilitate the drying or curing of such plants without removing or changing, at least to any appreciable extent, the desirable qualities originally found in the plants before being mowed; to avoid to a large degree the nutrient losses and deterioration ordinarily inherent in the usual or prevalent practices in the making and storage of hay.

The usual procedure prior to applicant's invention in drying or curing artificially or otherwise, green and freshly mown forage plants, was to subject them to the drying medium without first causing any substantial structural changes in them other than those incident to the mowing, handling or gathering. If any reduction in the length of the plants was made, the majority of the pieces were six inches or longer in length and such reduction was for the purpose of effecting a desirable matted layer or mass to control the directional movement of the drying medium passed through such layer or mass.

My process, for preparation of the plants for artificial drying is different from the usual procedure in that the green, freshly mown plant is broken down into finely divided pieces, with a percentage of these pieces reduced in diameter and with a substantial proportion of them crushed, mashed or flattened partially or wholly, thus causing an appreciable breaking down of the natural or fibrous structure, the rupturing of many of the cell walls and the liberation or releasing of a substantial portion of the liquid contained therein. Such structural changes in the plant increases the drying surface, improves availability of the moisture to the drying medium, decreases moisture tension and insulating properties and permits the utilization of temperatures much lower than otherwise required for desiccating a given volume of the forage material in a given time.

In carrying out this process or treatment, use is made of an apparatus in which the forage material, after first being harvested, is reduced from its original form to a more uniform size and the natural cellular structure destroyed as much as possible. The reducing mechanism of the apparatus may be of any suitable cutting or chopping construction which will not only cut the material but also tear, shred and bruise the same for the purpose of bringing the encased cellular moisture, coloring material and soluble food materials and other nutritional properties to the surface. This shredding and bruising action upon the material will also create a solution, natural or otherwise, which will be uniformly redistributed over and throughout the plant.

A further step of the process is to remove moisture and other undesirable properties, inert and foreign, from the organic material. This is done by subjecting the reduced plant material to the action of a drying agency, which in this instance may be heated air passed through the material until the same is thoroughly dried and ready for storage.

An important factor of the process is the cutting and shredding of the material thereby insuring greater surface exposure to the drying agencies used and which not only expedites drying but also results in a more uniform removal of the moisture contained in the material together with a better distribution of the soluble food and coloring materials throughout the product being processed.

The invention also has for its object the provision of an improved apparatus through the use of which the material, after being delivered to the receiving magazine or hopper of a chopping mechanism, will be reduced to a desired form, and by the provision of a conveyor in which the material delivered from the reducing mechanism is received and conveyed to a point in the direct path of an air blast, created jointly by a blower and a heater, by which the material is conveyed and blown into a drying chamber or tower preferably arranged vertically and subjected to the turbulent action of the heated air. The construction of the tower is such that the materials may be circulated therethrough over and over and brought successively into the path of the hot air streams until the same are thoroughly dried, after which the material may be removed from the drying tower.

The apparatus, which is also designed for the purpose of drying grain or other similar materials, may be operated without the use of the reducing machine due to the fact that the shape, size or other characteristics of the material are such that the same do not need to pass therethrough.

For a further understanding of the invention reference is to be had to the following description and to the accompanying drawing, in which:

Figure 1 is a vertical sectional view taken through the preferred form of the apparatus employed in carrying out the process, Figure 2 is an enlarged sectional view taken through the upper portion of the drying tower, Figure 3 is a horizontal sectional view taken on the line 3—3 of Figure 1 disclosing more in detail the shape of the cutter used in connection with the apparatus, Figure 4 is a perspective view showing a portion of a plant and the manner in which it is cut during the process, Figure 5 is a view showing a modified form of the apparatus.

Referring more particularly to the drawing, the numeral 1 designates the apparatus in its entirety, which comprises generally a cutting or reducing mechanism 2 and a drying mechanism 3. The apparatus is mounted upon a supporting base 4 and may be suitably braced by means of vertically extending rods 5 and, if desired, the said vertical rods may be further braced by uniting cross members 6. The plant cutting or reducing mechanism 2 comprises a magazine or hopper 7, into which material, such as hay or the like, is placed in its original form taken from the field and is permitted to drop by gravity or is fed therethrough by other means. From the hopper 7 the material is deposited upon a vertically positioned screw conveyor 8 which forces the material towards the cutting element 9 mounted on the lower end of the conveyor shaft 10. Any suitable means may be employed for giving motion to the conveyor. The cutting element 9 in this instance comprises a plurality of cutting fingers 11, which cooperate with the perforated end wall 12 situated at the lower end of the conveyor chamber to sever the material fed therethrough into suitable size. Not only does the cutter sever the material into suitable lengths, but it also shreds, bruises or macerates the same so as to break up or destroy the natural structure of the plant. This is effected by the peculiar shape of the cutter of which the cutting edges are bevelled on the side towards the perforated wall 12, permitting the material to get between the bevelled face of the cutter and said wall thus producing a tearing and bruising action as well as a reducing action.

Figure 4 of the drawing is intended to give an illustrative idea of the manner in which the plant or material is cut or shredded in order to bring the less colored body structure indicated by the letter A of the plant B to the surface where it will come in contact with the encased cellular moisture, colored material and soluble food material exuded by the bruising action of the cutter, which solution is then uniformly redistributed throughout the plant structure.

After the material has been acted upon by the severing cutter 9, it is deposited upon a second conveyor 13 which may also be of the screw-acting type and which is horizontally positioned below the cutter and has its ends journaled for rotation within bearings carried by the end walls 14 and 15 of the conveyor chamber or trough 16.

One end of the conveyor shaft may be equipped with a pulley 17 by which the conveyor may be driven from any suitable source of power. Communicating with the conveyor chamber 16 and arranged at the end thereof opposite that of the material inlet of the conveyor is an upstanding conduit 18 which extends through the sloping bottom wall 19 of an extension 20 forming a part of a drying chamber or tower 21. The conduit 18 is disposed axially of the drying tower and extends a short distance above the sloping wall 19. The tower 21 is preferably made cylindrical and formed to include reduced upper and lower end portions 22 and 23, of which the lower opens into the extension 20. Formed with the upper end portion 22 is a tubular section 24 opening into the atmosphere. A screen or cloth 25 may be positioned over the open upper end of the section 24 and held in place by a clamp ring 26, the purpose of the screen or cloth appearing later. Also communicating with the conveyor chamber 16 and disposed in axial alignment with the conduit 18, is a conduit branch 26 leading to the outlet side of a blower 27. The blower, which may be of the motor driven centrifugal type, has its air inlet side connected by means of a conduit 28 to the upper portion of a heater casing 29 of the heater 30. This heater, which may be of any suitable type, has positioned therein within the lower open end of the casing 29 a burner structure 31. A fuel line 32 extends to the burner 31 having a valve 33 for controlling the flow of fuel to the burner and which may be gas, oil or other heating fluid capable of raising the temperature of the air before entering the blower unit. It will, of course, be understood that the air may be heated after leaving the blower as well as before depending upon the type of blower or fan used or other conditions.

From the foregoing it will be seen that as the macerated material is deposited upon the conveyor 13, the same will be moved longitudinally of the latter until the material enters into the path of the air blast created by the blower. Due to the force of the air going through the conduit the material will be blown upwardly through the conduit 18 into the tower 21 where it will be subjected to the turbulence of the air stream and given a whirling motion. The material will thus be agitated within the tower by the upwardly moving hot air streams, and tossed about until the moisture in the material has become thoroughly removed. During this agitation of the material, parts thereof will fall upon the sloping wall 19 and gravitate to the open lower end of the extension 20 and into the conveyor chamber 16, where it again will be forced into the path of the air-blast created by the blower 27. This recirculation of the material insures complete drying thereof in a uniform manner, and as the material is a more or less shredded form the same is given greater exposure to the heated air to expedite drying and also results in the uniform distribution of the food and coloring material to all parts of the product.

The material which is moisture laden when injected into the drying tower by the air-blast will, due to its weight, only be lifted a short distance of the tower but will as the moisture is being removed therefrom be raised and agitated the full height of the tower. In this manner the operator can determine the drying condition of the material and know when it is thoroughly dry and ready for removal from the tower. It will be seen that due to the screen 25 positioned at the upper end of the tubular section 24, air is permitted to escape without allowing the material to pass out through the top of the tower. To regulate the air pressure within the tower and the outflow of air therefrom, there is provided within the section 24 a valve structure 34 which consists of a pair of sections 35 and 36 hingedly mounted and adapted to open and close as indicated by solid and dotted lines in Figure 3. The opening and closing of the sections 35 and 36 is governed by the operating cable 37 arranged within convenient reach of the operator. Windows 38 may also be provided in the side walls of the tower through which the operator can view the interior of the drying chamber. A valve 39 similar to valve 34, may also be positioned within the conduit 26 to regulate the inflow of air from the blower 27 and the temperature of the air can, of course, be regulated by the operation of the burner regulating valve 33. Part of the heated air from the tower may also be withdrawn by means of a pipe line 40 leading from the top of the extension 20 to the intake line 28 of the blower. The withdrawal of the air results in an economy of the heated air and the removal of the somewhat colder moisture laden air from the lower portion of the tower.

In the apparatus heretofore described, the green forage is fed into the apparatus through the cutting or reducing mechanism until a batch of suitable size, depending upon the size of the drying tower, is collected and then acted upon by the drying means after which it may be removed from the tower through the lower end of the extension 20 and the opening 40 situated in the bottom of the conveyor chamber. This opening is normally covered by a sliding plate 41 which by means of an operating extension 42 can be moved so as to uncover the opening. The opening 40 is arranged in an offset relationship with respect to the lower open end of the extension 20, so that by the rotation of the conveyor members 13 during the removal of the material the apparatus will be emptied in a quick and efficient manner.

In the modified form of the invention disclosed in Figure 5, there is shown an apparatus wherein the drying of hay or the like may be a continuous operation. This is accomplished by connecting a plurality of drying towers together in series and passing a hot air stream or other drying medium therethrough. The arrangement is such that the heated air is introduced from one end of the apparatus, while the hay to be dried is moved in the opposite direction through the drying medium. For the purpose of illustration, the solid line arrows *a* designate the direction of flow of the materials and the dotted line arrows *b* indicate the passage of air through the apparatus. The heated air or gases are first introduced into the lower end of the tower 43 and then moved upward and out through the top thereof and thence by means of a conduit 44 to the lower end of the tower 45, through which it is led in a similar manner as in the previous tower and is then passed out through the open top of the tower 46 to the atmosphere. The material which is introduced into the apparatus at the end opposite that of the heated air, is first fed through the reducing or cutting mechanism 47, which may be similar in construction to that of the preferred form and then moved by way of the conveyor 48 until it comes in contact with the upwardly directed hot air stream by which it is blown into the tower 46. Within this tower part of the moisture is removed from the material, as for example 10% of the volume as at this point the heating medium has spent some of its high temperatures. After subjecting to the agitating action within this tower, the material will drop by gravity through the entrance port 49 into contact with the section 50 of the conveyor 38 and move to the next tower where the operation is repeated. In this tower, which is designated by the numeral 45, 20% of the moisture contained in the material will be removed and by passing the material through the next tower 43 30% is removed. It will be understood that as many towers as required may be connected up in this manner. From the tower 43 the material is removed by means of the conveyor section 51 and down through the outlet conduit 52 and into bags 53 or other receptacles. Each of the towers 43, 45 and 46 is provided with screens 54 at the upper ends of the towers in order to prevent the material from being blown back by the air from one tower to the other and out to the atmosphere and at the same time allow the air to pass through the apparatus.

When the apparatus is used for drying grain or other similar materials, the reducing or cutting mechanism may be omitted and the material fed through the hopper 55 as shown in Figure 1, arranged below the cutter 9 and directly into the conveyor chamber 16. The flow of the material into the conveyor may be governed by a sliding plate 56 which is normally held open when the apparatus is used for drying hay. The screen 25 at the top of the tower in this instance is removed in order that the impure or undesirable substances of the grain can be removed with the air passing up through the top of the tower. By the regulation of the inlet and outlet valves 34 and 39 controlling the force of air through the tower and due to the weight of the grain the latter is prevented from being carried off by the air.

It will be seen that the present invention provides an apparatus in which hay, grain or other organic materials may be dried or treated to remove undesirable properties therefrom and to thoroughly redistribute the valuable food materials throughout all parts of the material. When hay is treated and dried the same comes from the apparatus in a somewhat shredded form, but retains a green color and typical odor.

The apparatus is composed of few and simple parts, is capable of being readily kept in order and moreover, the operation of the machine may be under the convenient control of a single operator as the apparatus is substantially automatic with the exception of the feeding of the material to the reducing mechanism. If desired the apparatus may be either stationary or portable so that it can be readily transported from place to place to operate in the field, in a barn or other suitable place of erection.

It will be understood, of course, that various changes may be made in the details of construction and arrangement of parts without departing from the spirit and scope of my invention, and I therefore do not desire to be limited to the specific construction and arrangement of parts shown and described.

What is claimed is:

1. The method of curing alfalfa and the like, which comprises cutting the plant when fresh and green, crushing the plant to release liquid contained in the cells thereof and then allowing the crushed plants to dry, the crushing and releasing of liquid serving to accelerate drying of the plant.

2. The method of accelerating the drying of alfalfa hay and the like to prevent bleaching, which comprises cutting the alfalfa while still green and forcing a portion of the liquid from the cells of the plant to the outside of the plant whereby it may quickly evaporate.

3. The method of curing alfalfa hay or the like, which comprises crushing the alfalfa whereby to remove some of the plant liquid to dye other parts of the plant, and then allowing the crushed plants to dry, the liquid crushed from the plants serving to accelerate the drying thereof.

4. The method of curing alfalfa and the like, which comprises cutting the plant when fresh and green, crushing the plant to release liquid contained in the cells thereof, and then drying the crushed plant.

5. The method of curing alfalfa hay and the like, which comprises the step of crushing fresh plants before curing, whereby liquid from the cells of part of the plant is liberated and other parts dyed thereby.

6. The method of curing alfalfa and the like, which comprises crushing the plant before drying to release liquid from the cells of the plant, whereby drying is accelerated.

7. The method of producing a prepared animal food which comprises reducing fresh, green, unripened plants to a crushed and comminuted state to liberate from the cellular structure of the plant so comminuted and crushed, a substantial proportion of the natural moisture and food materials therein and then subjecting the reduced material, without having removed said liberated moisture and while in a diffused and loose state, to the action of a fluid heat carrier, whereby to evaporate and remove only the water content naturally contained in said plants without any substantial loss of food nutrients and original color.

8. The method of producing a prepared animal food which comprises reducing green and freshly mown hay forming organic plants to a divided state by a combined comminuting and shredding operation, effective to bring to the surfaces of such reduced material a substantial portion of the natural cellular moisture, coloring matter and food nutrients present in said moisture, then without removing the moisture, transferring such reduced material to a desiccating zone and then while said material is in said zone in a relatively loose and free state passing a gaseous heat carrier therethrough to raise the temperature of the reduced material sufficiently to liberate the water content only thereof but without causing any substantial loss of the food nutrients and coloring matter.

9. The method of producing a prepared animal food which comprises reducing hay forming organic plants to a divided and crushed state by a cutting and shredding operation sufficiently effective to bring to the surfaces of such reduced material natural cellular moisture, chlorophyl and food nutrients present in said moisture, whereby said reduced and crushed material is thoroughly commingled, and a substantially uniform color imparted to the mass thereof, then without removal of the moisture transferring such reduced material in its entirety to a desiccating zone, and heating the reduced material while in said desiccating zone sufficiently to substantially drive off the water content thereof but leaving in the mixture without substantial diminution in quality and quantity the food nutrients and chlorophyl.

10. The method of producing a prepared animal food which comprises reducing hay-forming organic plants to a divided state by cutting and shredding and crushing operation sufficiently effective to bring to the surfaces of such reduced material natural cellular moisture, chlorophyl and food nutrients present in said moisture, whereby said reduced material is thoroughly commingled, moisture extracted from the cells thereof and a substantially uniform color imparted to the mass thereof, then without removal of the moisture transferring such reduced material in its entirety to a desiccating zone, heating the reduced material while in said desiccating zone sufficiently to drive off the water content thereof but leaving in the desiccated plants the food nutrients and chlorophyl normally contained in said moisture, and removing the moisture freed reduced material in a substantially dry state from the desiccating zone.

11. The method of preparing an animal food which comprises mowing unripened fresh green plants, crushing and comminuting the mown plants, and drying the crushed and comminuted material, whereby to produce a dehydrated product having substantially the same food characteristics and color of the original green plants.

12. The method of preparing an animal food which comprises mowing unripened fresh green plants, comminuting and crushing the cut plants to release their normal cellular liquids, and drying the material thus comminuted and crushed by the use of heated air without substantial loss of the food nutrients and color originally present in the plants.

13. The method of preparing an animal food which comprises mowing fresh green plants, comminuting and crushing the cut plants to substantially release the cellular liquid content thereof, and drying the material thus comminuted and crushed with the use of heated air but without substantial loss of the food nutrients and color originally present in such plants, such air being applied at temperatures insufficient to decompose or destroy the plants and plant ingredients while undergoing such desiccation.

EARL A. CHENAULT.